W. A. TRITTON.
ENDLESS MOVING CHAIN TRACK.
APPLICATION FILED JULY 24, 1917.
1,294,200.
Patented Feb. 11, 1919.
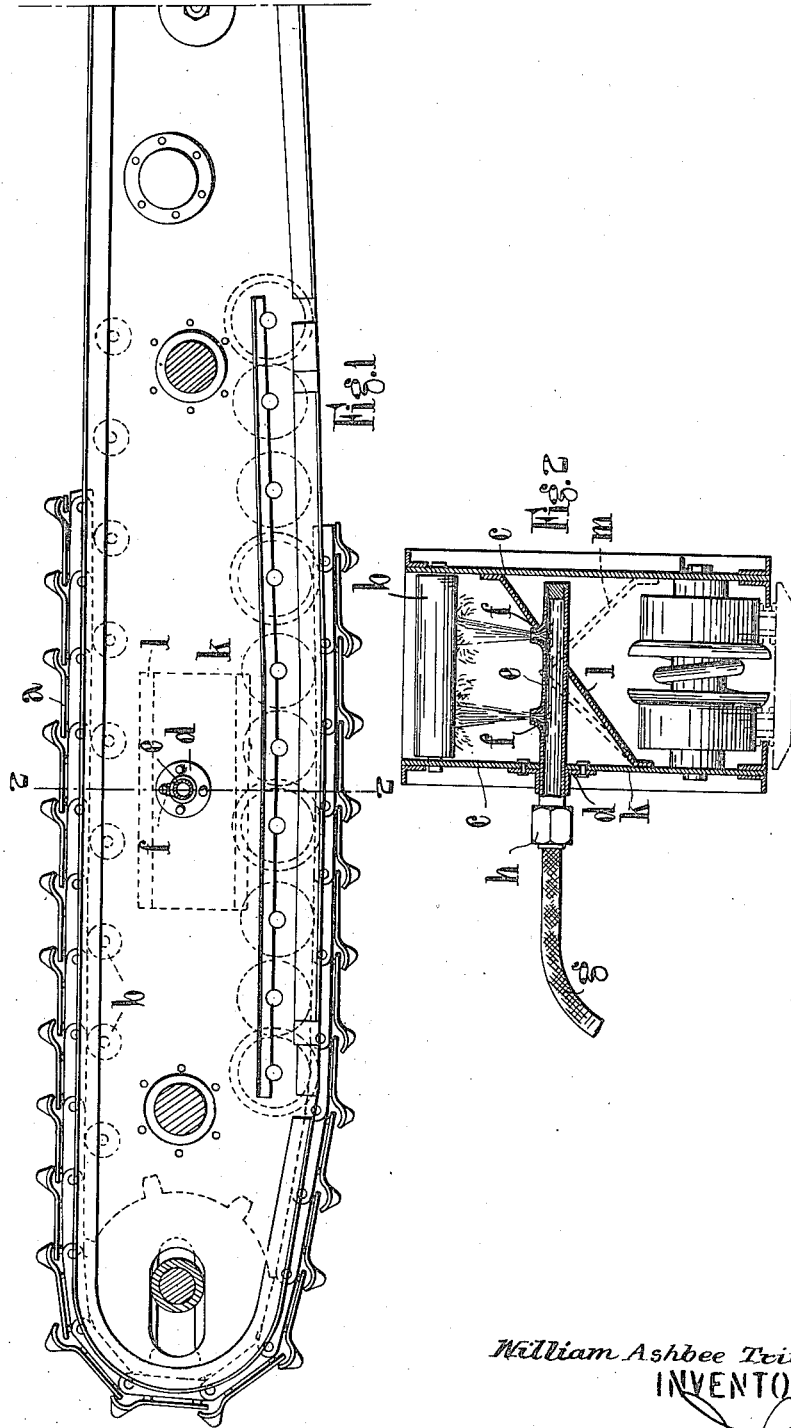
William Ashbee Tritton
INVENTOR
BY
ATTORNEYS

UNITED STATES PATENT OFFICE.

WILLIAM ASHBEE TRITTON, OF LINCOLN, ENGLAND.

ENDLESS MOVING CHAIN TRACK.

1,294,200.     Specification of Letters Patent.     Patented Feb. 11, 1919.

Application filed July 24, 1917. Serial No. 182,567.

*To all whom it may concern:*

Be it known that I, Sir WILLIAM ASHBEE TRITTON, a subject of the King of Great Britain and Ireland, of Wellington Foundry, Firth Road, Lincoln, in the county of Lincoln, England, consulting engineer, have invented certain new and useful Endless Moving Chain Tracks, of which the following is a specification.

This invention relates to the endless moving chain tracks of motor tractors.

After such devices have been in operation and on muddy ground, they become clogged and stiff and the more so when used under war conditions, and it is very difficult to clean them by any ordinary means.

The object of the present invention is to quickly and conveniently remove the accumulation of mud and so forth that has worked into the linked system of track plates and rail heads mounted thereon, that constitute the endless track mechanism, and also to lubricate them after being cleansed if so desired.

The invention consists in arranging adjacent to the track band or bands a pipe or pipes adapted to be connected with a water supply preferably under pressure to discharge water out and through the band preferably through a flexible hose pipe to enable the motor tractor to simultaneously move so that the whole of the track band may be cleansed, the refuse passing away by means of a sludge discharge plate or plates and an opening or openings in or connected to the side framing of the track bands.

The invention also consists in subsequently disconnecting the water supply and connecting up to a lubricant supply to enable lubricant to be applied to the band, after which the pipe or pipes are filled with thick lubricant or otherwise protected from being choked with mud during the normal running of the tractor.

The invention will now be described with reference to the accompanying drawings in which, Figure 1 is a side elevation of an endless chain track frame and Fig. 2 is a vertical transverse section thereof on line 2—2.

In carrying the invention into effect according to one embodiment, the upper or return stretch *a* of the track band is carried upon rollers or other weight supporting members *b*, carried by a pair of side frames *c* between which the band operates. At a convenient point in one of the side frames *c*, below the upper stretch *a* of the band an orifice is formed, secured within which, by flanges *d* or otherwise, is an inwardly extending elbow or other shaped pipe or duct *e* having one or more upwardly pointing nozzles *f* close beneath the reversed track plates. The other end of the pipe or duct projects outside of the framing and is so formed as to be adapted for detachable connection with the end of a flexible hose pipe *g* which is in communication with a preferably high pressure water or hydraulic system such as a public water main or other service, suitable shut-off valves or other appliances being provided.

In the present example the connection of the duct *e* to the hose pipe *g* is effected by an ordinary union connection shown as *h*.

Assuming that such connection is made, and the water turned on, the water is projected with considerable force from the nozzle or nozzles *f* of the internal pipe *e* upward against the back of and through the track band, thoroughly washing away the mud, the motor tractor in the meantime being slowly run backward and forward so that the whole of the band may be treated, this being permitted by the flexibility of the hose pipe. To remove the refuse and dirty water, a sludge opening *k* is provided to discharge to one or both sides through the frames *c* a sloping discharge plate *l* being arranged beneath the track band adjacent the water supply nozzles.

After the cleansing process is accomplished the hose or water pressure is cut off, and the hose pipe connected to a suitable supply of lubricant under hand or other pressure so that the track band may be thoroughly lubricated, finally, the hose pipe is disconnected and the inner nozzle pipe filled with a thick lubricating grease to prevent its being choked with mud during normal running. "Stauffer" is convenient for such use and it will be blown out when the water is turned on for the next washing.

It will be understood that various modifications may be made without departing from the underlying principle of the invention, for instance, the water pressure may be obtained by hand or other means; the inner pipe may be perforated or slotted instead of being nozzled; and instead of filling or choking the pipe with "stauffer" it may be valved by an external sleeve or otherwise projected. Furthermore the nozzled ducts *e* may be duplicated and the discharge plate *l* may extend beneath the reversed track band over approximately its whole length and a number of discharge openings *k* may be provided at intervals in the side frame. Such discharge members may be of V-shaped section as indicated in dotted lines in Fig. 2 at *m* so as to discharge on both sides. Should the continuous discharge opening *k* tend to weaken the tractor a number of separate openings may be arranged for.

In a further modification two or more track bands may be filled by one pipe or the water may be heated.

Having now described my invention what I claim as new and desire to secure by Letters Patent is:—

1. Apparatus for the purpose described comprising in combination an endless moving chain track, a track frame for supporting and guiding the moving track, means for leading water into the track frame whereby it may be discharged on to and through the chain track, and means whereby the resulting sludge may be discharged from the frame.

2. Apparatus for the purpose described, comprising in combination, an endless moving chain track, a track frame therefor, stationary means for leading water into the track frame whereby it may be discharged on to and through the whole of the chain track while the said track is in movement, and means whereby the resulting sludge may be discharged from the frame.

3. Apparatus for the purpose described, comprising in combination, a track frame having a discharge opening in the side thereof, a sloping surface in the frame leading down to said opening, an endless moving chain track on the said frame whose upper stretch is above the sloping surface, means for leading water under pressure into the track frame adjacent the sloping surface and whereby the water may be discharged on to and through the upper stretch of the track, the resulting sludge dropping down on to the sloping surface so as to be discharged from the frame through the discharge opening at the side thereof.

4. Apparatus for the purpose described comprising in combination a track frame having a discharge opening in the side thereof, a sloping surface inside the frame and leading down to the said opening, an endless moving chain track on the said frame whose upper stretch is above the sloping surface, a pipe for leading water under pressure into the track frame adjacent the sloping surface, and means on the pipe for discharging water in jet form on to and through the reversed upper stretch of the track, the resulting sludge dropping down on to the sloping surface so as to be discharged from the frame through the discharge opening at the side thereof.

5. Apparatus for the purpose described, comprising in combination an open track frame having a discharge opening in the side thereof, a sloping surface inside the frame and leading down to the said opening, guide members spanning the upper side of the track frame an endless track moving around the said frame and over said guide members and part of said track passing above the sloping surface, a pipe extending centrally and transversely through one side of and into the track frame, nozzles on the pipe pointing upward and a flexible hose pipe for leading water into the nozzle pipe, whereby the reversed upper stretch of the moving track is cleaned and the resulting sludge washed away.

6. Apparatus for the purpose described comprising in combination, an endless moving chain track, a track frame for supporting and guiding the moving track, means for first leading water into the track frame whereby it may be discharged on to and through the chain track, the resulting sludge washed away and means for subsequently leading oil into the track frame to lubricate the track.

7. Apparatus for the purpose described, comprising in combination an open track frame having a discharge opening in the side thereof, a sloping surface inside the frame and leading down to the said opening, an endless moving track moving around the said frame, part of said track passing above the sloping surface, a pipe extending centrally and transversely through one side of and into the track frame, nozzles on the pipe inside the frame and pointing upward and a flexible hose pipe for first leading water into the nozzle pipe to wash the chain track and then leading oil into the nozzle pipe to lubricate the track, means for discharging the sludge resulting from the washing, and means for preventing the nozzles being choked while the chain track is in actual use.

8. Apparatus for the purpose described comprising in combination, an open track frame having a discharge opening in the side thereof, a sloping surface inside the frame and leading down to the said opening, guide members spanning the open upper side of the track frame, an endless track moving around the said frame and over said guide members and part of said track passing above the sloping surface a pipe extending centrally and transversely through one side of and into the track frame, nozzles on the pipe inside the frame and pointing upward and a flexible hose pipe for first leading water into the nozzle pipes to wash the chain track and then leading oil into the nozzle pipe to lubricate the track means for discharging the sludge resulting from the washing and a filling of thick lubricating grease placed in the nozzles to prevent them being choked with mud while the chain track is in actual use.

In testimony whereof I have signed my name to this specification.

WILLIAM ASHBEE TRITTON.